United States Patent [19]
O'Byrne

[11] Patent Number: 5,390,043
[45] Date of Patent: Feb. 14, 1995

[54] COMPRESSED CHANNEL SPACING FOR OPTICAL HETERODYNE COMMUNICATION SYSTEMS

[75] Inventor: Vincent A. O'Byrne, Boston, Mass.

[73] Assignee: GTE Laboratories Incorporated, Waltham, Mass.

[21] Appl. No.: 654,153

[22] Filed: Feb. 12, 1991

[51] Int. Cl.$^6$ .................................... H04B 10/06
[52] U.S. Cl. .................................... 359/191; 359/189
[58] Field of Search ............... 359/189, 190, 191, 192, 359/193, 194, 195

[56] References Cited

U.S. PATENT DOCUMENTS 4,777,664  10/1988  Ishoe ........................ 359/125
4,893,352  1/1990  Welford ..................... 359/191

FOREIGN PATENT DOCUMENTS 62-43231  2/1987  Japan ..................... H04B 9/00

Primary Examiner—Herbert Goldstein
Assistant Examiner—Rafael Bacares
Attorney, Agent, or Firm—Lawrence E. Monks

[57] ABSTRACT

In an optical heterodyne communication system for transmission of multiple optical channels at different wavelengths, the optical channels are grouped into blocks for increased utilization of the available bandwidth. The spacing between optical channels within a block is typically equal to or somewhat greater than the channel bandwidth. The spacing between blocks is such that when the optical signal is heterodyned with a local oscillator lightwave, the interference with a selected optical channel from adjacent blocks does not exceed a predetermined level.

32 Claims, 5 Drawing Sheets

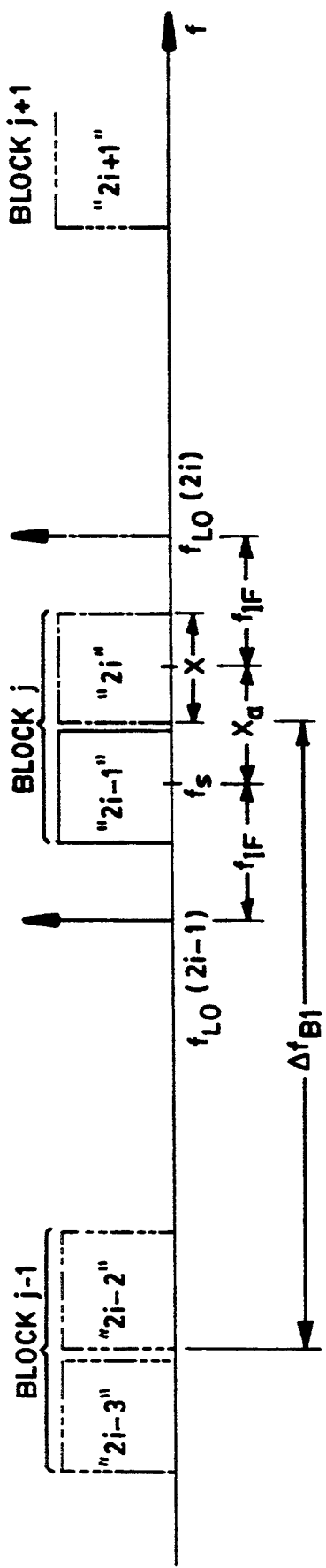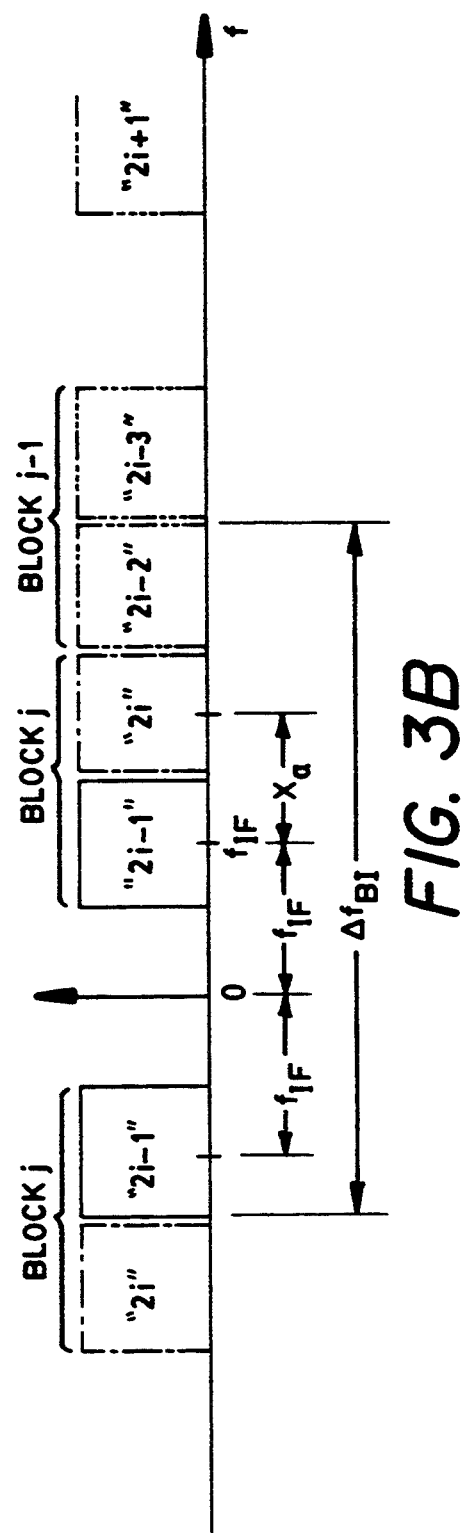

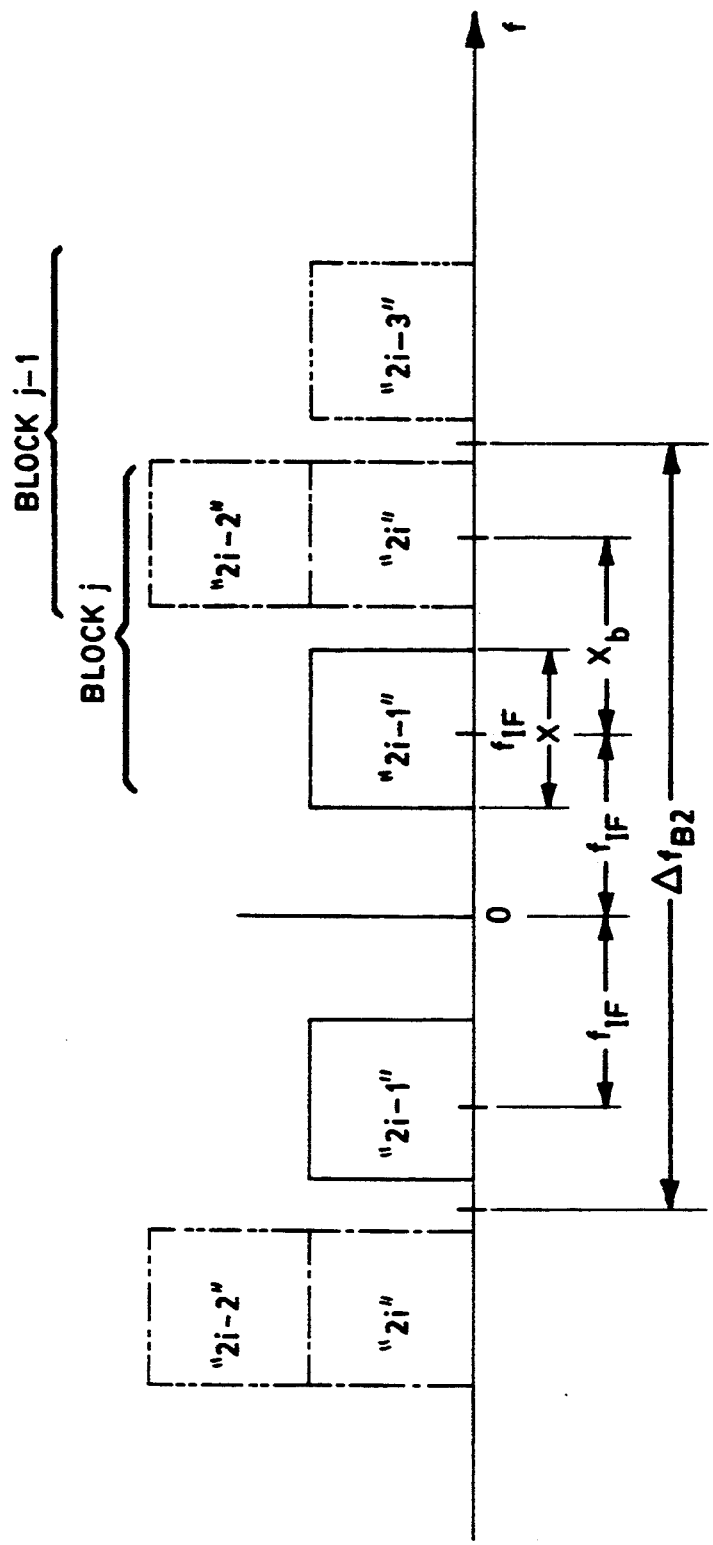

COMPRESSED CHANNEL SPACING FOR OPTICAL HETERODYNE COMMUNICATION SYSTEMS

FIELD OF THE INVENTION

This invention relates generally to optical heterodyne communication systems and, more particularly, to optical heterodyne communication systems having compressed channel spacing and to methods for obtaining compressed channel spacing in optical heterodyne communication systems.

BACKGROUND OF THE INVENTION

Optical fiber transmission systems are being extensively used in the telephone network for long distance and interoffice trunk lines because of their wide bandwidth, small size and insensitivity to electrical interference. Conventional long distance optical transmission systems utilize time division multiplexed digital transmission. The maximum data rate available in commercial lightwave systems was for many years limited to 565 megabits per second and has recently been increased to 1.7 gigabits per second.

Wide transmission bandwidth and high receiver sensitivity can be realized with coherent, or heterodyne, optical communication systems using multiple modulated optical carriers which are closely spaced in frequency. Coherent systems with multiple optical carriers have been disclosed by Shikada in "Multiplex Transmitting Method for Optical Heterodyne/Homodyne Detection Wavelength", Japanese Patent Publication No. 62-43231, 1987. In the Shikada system, one information channel is transmitted on each optical carrier, and N optical carriers can be utilized.

In a typical optical heterodyne communication system, the transmitted optical signal is formed by combining modulated optical carriers originating from plural lasers which emit optical carriers at different optical frequencies. Each laser is directly modulated by an information signal. Alternatively, separate modulators may be used to modulate the respective optical carriers. The modulated carriers are combined in an optical combiner to form an optical signal. The optical signal is then transmitted to a remote receiver over an optical fiber. The received optical signal is heterodyned with a local oscillator lightwave of a different frequency to provide an intermediate frequency signal. The resulting intermediate frequency signal is passed through a filter that selects a desired optical channel from the optical signal, while attenuating the other optical channels. The filtered signal is electronically processed to extract the information signal transmitted on the selected optical channel.

In order to achieve efficient use of the available bandwidth and to avoid interference, or crosstalk, between adjacent channels, optical channels must be carefully assigned. FIG. 1a is an optical frequency spectrum which illustrates a current approach to optical channel spacing in optical heterodyne communication systems. Successive channels i and i+1 are separated from each other by a frequency difference $\Delta f_c$. Optical channels i and i+1 are shown in FIG. 1a relative to local oscillator frequencies $f_{LO}(i)$ and $f_{LO}(i+1)$, which are generated by the local oscillator in the receiver to select optical channels i and i+1, respectively. It is to be understood that the local oscillator generates only one local oscillator frequency at a time.

When optical channel i is the selected channel, the optical signal in channel i centered on frequency $f_s$ is heterodyned to an intermediate frequency $f_{IF}$ which is equal to $f_s - f_{LO}$. The optical channel spacing must be selected so that the level of crosstalk between the selected channel and adjacent channels is acceptable for a given application.

FIG. 1b depicts the intermediate frequency spectrum resulting from heterodyning. The heterodyning of the local oscillator lightwave with the received optical signal results in positive and negative frequency images of each of the optical channels. The positive image of the optical channel i is centered at the intermediate frequency $f_{IF}$. The corresponding negative image is centered at frequency $-f_{IF}$. Likewise, the positive and negative images of channel i-1 result from heterodyning as shown in FIG. 1b. In particular, the positive image of channel i-1 is positioned in a frequency range adjacent to the positive image of channel i. To prevent an unacceptable level of interference between adjacent channels, the channel spacing is selected such that adjacent channels do not overlap after heterodyning. Typically, the channel spacing $\Delta f_c$ is selected so that $$\Delta f_c \geq 2f_{IF} + X,$$

where X is the bandwidth of the optical channels. In order to prevent channel overlap after heterodyning, the channel spacing $\Delta f_c$ must satisfy the above inequality.

The above approach is inefficient in its use of the available spectrum. In particular, there are unused portions of the spectrum in such systems. This inefficiency limits the number of optical channels that may be assigned to a given frequency range. The maximum number of channels that can be heterodyned is limited by the continuous tuning range of the local oscillator laser in the receiver. The tuning range of different laser types varies greatly and is small for some commercially available laser types. It is therefore desirable to provide techniques for reducing channel spacing in optical heterodyne communication systems, thereby facilitating use of less sophisticated lasers as local oscillators and increasing the information-carrying capability of such systems.

Image rejection receivers, wherein one of the signal sidebands is suppressed, permit closer optical channel spacing. However, image rejection receivers are relatively complex and expensive.

It is a general object of the present invention to provide improved optical communication systems.

It is another object of the present invention to provide optical heterodyne communication systems wherein the average channel spacing is reduced in comparison with prior art systems.

It is another object of the present invention to provide compressed optical channel spacing in an optical heterodyne communication system.

It is a further object of the present invention to provide an optical heterodyne system with compressed channel spacing using conventional optical communication equipment.

It is another object of the present invention to provide compressed optical channel spacing without increasing interference from adjacent channels.

SUMMARY OF THE INVENTION

According to the present invention, these and other objects and advantages are achieved in a method for assigning optical channels for transmission of an optical signal in an optical heterodyne communication system. The method comprises the steps of grouping the optical channels into blocks, each block including at least two optical channels having a predetermined channel spacing in the frequency spectrum and selecting a block spacing $\Delta f_B$ between blocks in the frequency spectrum such that when the optical signal, including a selected optical channel centered at frequency $f_s$, is heterodyned with a local oscillator lightwave at a frequency $f_{LO}$ to produce an intermediate frequency signal centered at frequency $f_{IF}$, interference in the selected channel resulting from adjacent block is less than a predetermined value.

In a first embodiment of the invention, the step of selecting a block spacing $\Delta f_{B1}$ is performed such that the inequality $$\Delta f_{B1} \geq 2f_{IF} + 3X_a,$$

where $X_a$ = the channel spacing within a block, is satisfied. In the first embodiment, the channel spacing $X_a$ is typically equal to or slightly greater than the bandwidth X of each optical channel. The average channel spacing is one half of the block spacing, or $\Delta f_{B1}/2$.

In a second embodiment of the invention, the block spacing $\Delta f_{B2}$ is selected such that the inequality $$\Delta f_{B2} \geq 2f_{IF} + 2X_b,$$

where $X_b$ = the channel spacing within a block, is satisfied. In the second embodiment, the block spacing $\Delta f_{B2}$ is established such that in the intermediate frequency spectrum a channel in an adjacent block overlaps the nonselected channel in the selected block. In order to obtain comparable performance, the channel spacing $X_b$ within blocks in the second embodiment is greater than the channel spacing $X_a$ within blocks in the first embodiment. The average channel spacing is one half of the block spacing, or $\Delta f_{B2}/2$.

The channel spacing $X_a$, $X_b$ within blocks for both the first and second embodiments is determined so as to provide an acceptable level of interference from nonselected channels. More specifically, interference between channels is defined in terms of an acceptable power penalty. The power penalty is an increase in transmitted power that is required to obtain the same level of performance that would be obtained in the absence of interference from adjacent channels. The power penalty can also be viewed as a reduction in receiver sensitivity due to interference from adjacent channels. Typically, an acceptable power penalty is about 1 dB. In the first embodiment, interference is generated by a single adjacent channel, and the acceptable power penalty can typically be achieved when the channel spacing $X_a$ is equal to or slightly greater than the bandwidth of each optical channel. In the second embodiment, interference is generated by two adjacent overlapping channels in different blocks, and the channel spacing $X_b$ must be increased in order to obtain the same level of performance that was obtained in the first embodiment. However, in the second embodiment, the average channel spacing is less than the average channel spacing in the first embodiment because the block spacing is smaller in the second embodiment. Although the block channel spacing technique of the present invention provides nonuniform spacing between optical channels, the average channel spacing is less than in prior art optical heterodyne communication systems.

In accordance with another aspect of the invention, there is provided an optical heterodyne communication system comprising an optical transmitter for transmitting an optical signal including a plurality of optical channels, the optical channels being grouped into blocks, wherein each block includes at least two optical channels having a predetermined channel spacing in the frequency spectrum and adjacent blocks are spaced in the frequency spectrum by a block spacing $\Delta f_B$ such that when an optical signal, including a selected optical channel centered at a frequency $f_s$, is heterodyned with a local oscillator lightwave at a frequency $f_{LO}$ to produce an intermediate frequency signal centered at frequency $f_{IF}$, interference in the selected channel from adjacent blocks is less than a predetermined value. The optical heterodyne communication system further includes an optical receiver for receiving the optical signal, including means for heterodyning the optical signal with the local oscillator lightwave to produce an intermediate frequency signal and means responsive to the intermediate frequency signal for extracting an information signal from the selected channel, and optical waveguide means for carrying the optical signal from the optical transmitter to the optical receiver.

When the selected optical channel is the higher frequency channel in a block, the receiver optical signal is heterodyned with a local oscillator lightwave at a frequency that is higher than the center frequency of the selected optical channel. When the selected optical channel is the lower frequency channel in a block, the received optical signal is heterodyned with a local oscillator lightwave at a frequency that is lower than the center frequency of the selected optical channel.

The optical transmitter preferably comprises multiple lasers, one for each optical channel. The output wavelengths of the lasers are set in accordance with the above channel spacing technique so that the optical channels are grouped into blocks. Each laser is modulated with an information signal. The modulated carriers from each laser are combined and are transmitted on a single optical fiber to the receiver.

BRIEF DESCRIPTION OF THE DRAWINGS

For a better understanding of the present invention together with other and further objects, advantages and capabilities thereof, reference is made to the accompanying drawings which are incorporated herein by reference and in which:

FIGS. 3a and 3b are spectral diagrams that illustrate a first embodiment of the channel spacing technique of the present invention;

FIG. 4 is a spectral diagram that illustrates a second embodiment of the optical channel spacing technique of the present invention.

DETAILED DESCRIPTION OF THE PREFERRED EMBODIMENTS

Figure 1A:
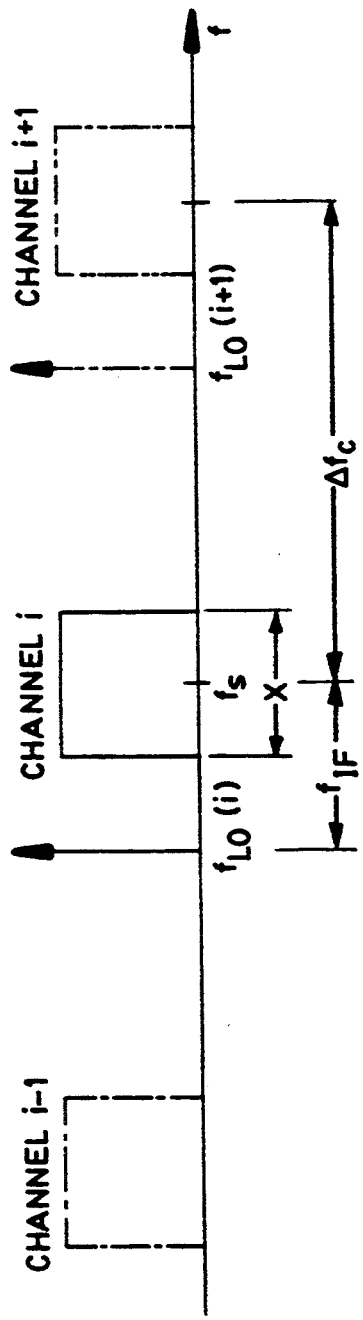
FIGS. 1a and 1b are spectral diagrams that illustrate a channel spacing scheme used in a conventional optical heterodyne communication system.
Figure 1B:
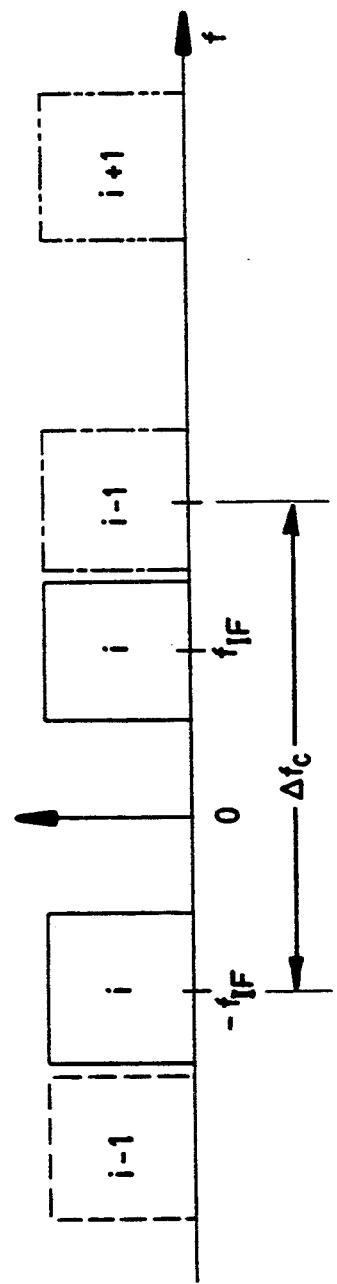

The present invention provides a technique for reducing the average optical channel spacing in an optical heterodyne communication system without causing an increase in interference between channels. This compressed channel spacing technique makes it possible to utilize a larger number of optical channels than is possible in conventional optical heterodyne communication systems. The present invention realizes compressed optical channel spacing by grouping optical channels into blocks as described below. The present invention also provides an optical heterodyne communication system which incorporates the channel spacing technique.

The channel spacing techniques described herein has general applicability to optical heterodyne communication systems. For illustrative purposes, the technique is described with reference to an exemplary system. An optical communication system shown in FIG. 2 comprises a transmitter 10 which includes N different lasers 20, 22, 24, 26 and 28. Each laser 20, 22, 24, 26 and 28 generates a different wavelength, or optical frequency, and is directly modulated via an electrical bias current so that it provides an optical signal in a specified optical channel. The lasers should be narrow in linewidth compared with the transmitter bit rate, a condition that is typically satisfied for coherent optical communication systems. The input bias signal is denoted as $I_{biasi}$, where i indicates the number of the laser (ranging from 1 to N). The optical signals emitted by the lasers are transmitted over separate single mode optical fibers 32 to an optical combiner 30. The optical signals can be transmitted from the lasers to the optical combiner 30 using any suitable optical waveguide. The optical combiner 30 can be an optical fiber combiner which utilizes fused optical fibers. The optical combiner 30 combines the optical signals in all of the optical channels into a single optical signal.

The combined optical signal is transmitted from the optical combiner 30 on a single optical fiber 33 to an optical receiver 37 at a remote location. In the receiver 37, the combined signal and a lightwave from a local oscillator 34 are added by a polarization maintaining fiber coupler 35. The frequency of the lightwave from the local oscillator 34 is selected such that the difference between the frequency of local oscillator 34 and the center frequency of a selected channel is equal to a predetermined intermediate frequency. The output of fiber coupler 35 is applied to a photodetector 36 which generates the sum and difference frequencies of the received optical signal and the local oscillator lightwave and thereby provides an intermediate frequency signal. The intermediate frequency signal is coupled through a bandpass filter 38 to an electrical receiver 40. The bandpass filter 38 passes the selected channel and attenuates other channels. The receiver 40 extracts the information signal from the intermediate frequency signal in accordance with conventional techniques.

Figure 2:
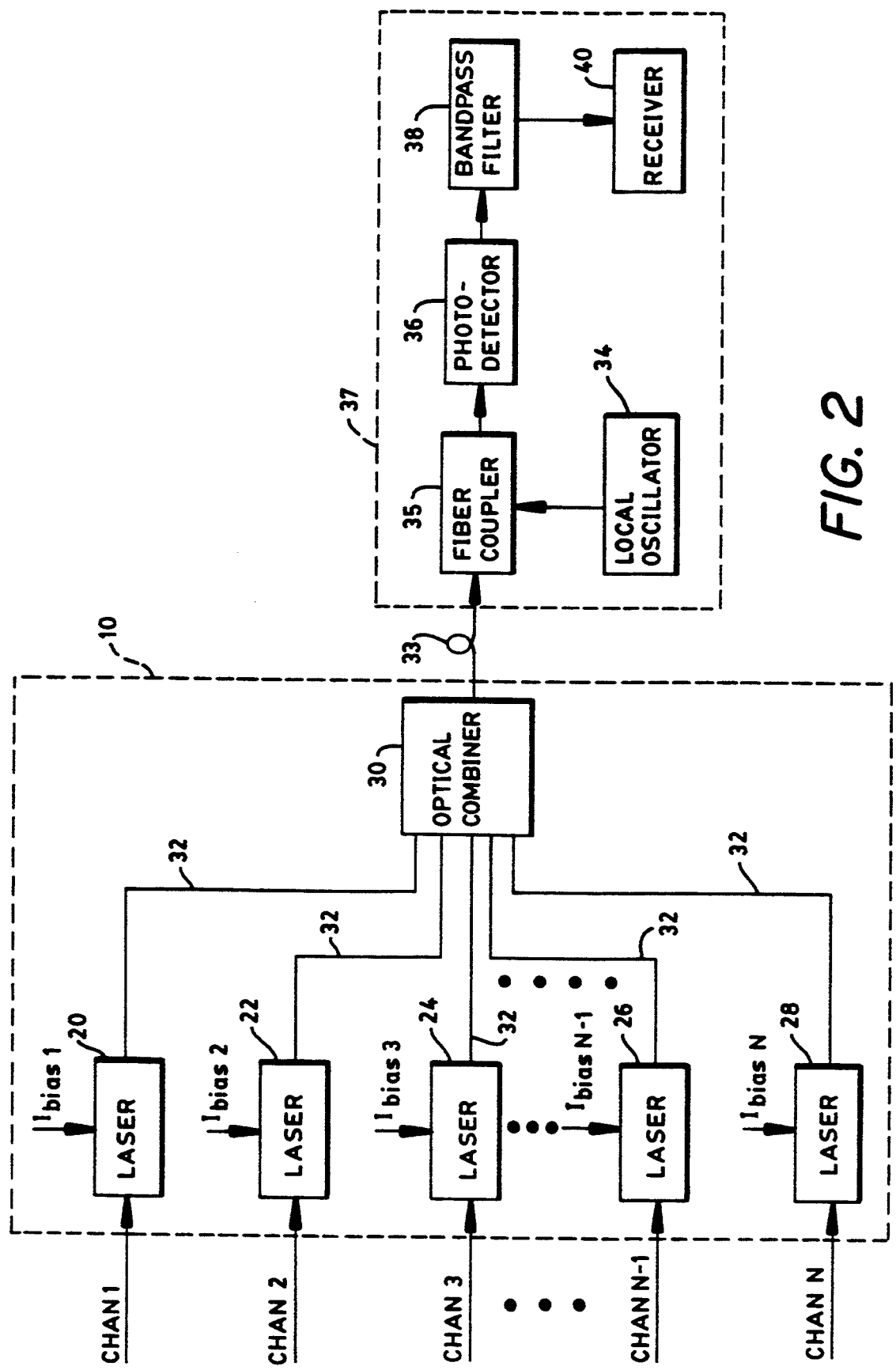
FIG. 2 is a block diagram of an optical heterodyne communication system suitable for implementation of the channel spacing technique of the present invention.

The compressed optical channel spacing in accordance with a first embodiment of the present invention is shown in FIGS. 3a and 3b. The wavelengths of the lasers 20, 22, 24, 26 and 28 of FIG. 2, are set by appropriate adjustment of bias currents $L_{biasi}$ to establish the optical channel spacing shown in FIG. 3a. In accordance with this channel spacing, optical channels are grouped into blocks. As shown in FIG. 3a, a block j includes optical channels 2i-1 and 2i. A block j-1 includes optical channels 2i-3 and 2i-2. Each optical channel has a bandwidth X. The optical channels within each block have a channel spacing $X_a$, and adjacent blocks are separated by a frequency difference $\Delta f_{B1}$. The block spacing $\Delta f_{B1}$ is greater than the channel spacing $X_a$ within each block so that the optical channels are nonuniformly distributed in the available spectrum. However, as discussed below, the disclosed channel spacing technique provides a smaller average channel spacing than prior art channel spacing techniques. The channel spacing $X_a$ is equal to or slightly greater than the bandwidth X of each channel in the first embodiment.

The value of channel spacing $X_a$ is determined by the level of interference between adjacent channels that is acceptable for a given application and modulation type. In general, there is an inverse relationship between channel spacing and interference. The acceptable level of interference from adjacent channels varies for audio signals, data signals, video signals, and the like. The interference from adjacent channels can be defined in terms of an acceptable power penalty $P_{pen}$. The power penalty is the increase in transmitted power that is required to provide the same level of performance that would be obtained in the absence of interference from adjacent channels. The power penalty can also be viewed as a reduction in receiver sensitivity due to interference from adjacent channels. An acceptable power penalty is typically about 1 dB. The power penalty $P_{pen}$ is expressed as $$P_{pen}=10[\log (1+N_X \ln(2P_e))]. \tag{1}$$

where $N_x$ is the fraction of power of the neighboring channels that overlaps into the bandwidth of the intermediate frequency filter 38 and $P_e$ is the acceptable probability of error, typically about $10^{-9}$ for optical digital systems. The channels spacing $X_a$ within each block is determined from $P_{pen}$ by plotting the electrical spectrum of the FSK or ASK signal measuring the fraction of power $N_x$ that falls within the filter bandwidth and obtaining $P_{pen}$ from equation (1). The channel spacing $X_a$ is varied until the desired value of power penalty $P_{pen}$ is obtained.

The block spacing $\Delta f_{B1}$ between adjacent blocks j and j-1 is described with reference to FIGS. 3a and 3b. Assume that channel 2i-1 in block j is the selected channel to be received. The frequency of local oscillator 34 in the receiver 37 is displaced negatively by $f_{IF}$ with respect to the center frequency $f_s$ of channel 2i-1 so that the local oscillator generates a frequency $f_{LO}(2i-1)$. When the received optical signal is heterodyned with the local oscillator lightwave at frequency $f_{LO}(2i-1)$, the intermediate frequency spectrum shown in FIG. 3b is obtained. The selected channel 2i-1 is centered on intermediate frequency $f_{IF}$, and channel 2i is centered at frequency $f_{IF}+X_a$. The positive image of block j-1, which results from heterodyning local oscillator frequency $f_{LO}(2i-1)$ with block j-1, is positioned just above block j in the intermediate frequency spectrum, as shown in FIG. 3b. The block spacing $\Delta f_{B1}$ is selected in this embodiment such that the image of block j-1 does not overlap block j in the intermediate frequency spectrum. It can be seen in FIG. 3b that the block spacing $\Delta f_{B1}$ to meet this requirement is $$\Delta f_{B1} \geq 2f_{IF} + 3X_a \qquad (2)$$

Since each block contains two optical channels, the average channel spacing is one half the block spacing, or $\Delta f_{B1}/2$. From equation (2), $$\Delta f_{B1}/2 \geq f_{IF} + (3/2)X_a \qquad (3)$$

Hence, this approach represents a substantial reduction in average channel spacing relative to the channel spacing in the conventional system (which is a minimum of $2f_{IF}+X$).

The above example is illustrative of the case wherein the lower frequency channel in a block, such as channel $2i$-$1$, is selected. In the case where the higher frequency channel in a block, such as channel $2i$, is selected, the local oscillator frequency is positively displaced relative to the selected channel, as opposed to being negatively displaced. Thus, when channel $2i$ is to be received, the local oscillator frequency $f_{LO}(2i)$ is set at a frequency higher than channel $2i$, as shown in FIG. 3a. In the intermediate frequency spectrum, the image of block $j+1$ (not shown) appears in a frequency range just below block $j$ without overlap. In the first embodiment shown in FIG. 3b, channels $2i$-$2$ and $2i$-$3$ of block $j$-$1$ contribute very little interference with selected channel $2i$-$1$.

In accordance with a second embodiment of the present invention, the blocks are more closely spaced than in the first embodiment so that, after heterodyning, the intermediate frequency spectrum appears as shown in FIG. 4. In FIG. 4, channel $2i$-$1$ is the selected channel. In accordance with the second embodiment, the average channel spacing is further reduced by establishing a block spacing $\Delta f_{B2}$ such that channel $2i$-$2$ of block $j$-$1$ overlaps channel $2i$ of block $j$ in the intermediate frequency spectrum. In order to adequately limit the adjacent channel crosstalk in the second embodiment, the spacing $X_b$ between channels within a block is larger than the channel spacing $X_a$ in the first embodiment. Since channel $2i$ of block $j$ and channel $2i$-$2$ of block $j$-$1$ occupy the same portion of the intermediate frequency spectrum, channels $2i$ and $2i$-$2$ both cause interference with selected channel $2i$-$1$. The channel spacing $X_b$ for the second embodiment is determined from the acceptable power penalty $P_{pen}$ in the same manner described hereinabove in connection with determining the channel spacing $X_a$ of the first embodiment. Thus, for example, a channel spacing $X_b$ to provide a power penalty of 1 dB may be determined. Since overlapping channels $2i$ and $2i$-$2$ both interfere with selected channel $2i$-$1$, the channel spacing $X_b$ must be greater than the channel spacing $X_a$ in the first embodiment in order to obtain the same power penalty. However, as described below, the average channel spacing in the second embodiment is less than the average channel spacing in the first embodiment, because the block spacing is smaller in the second embodiment.

The spacing $\Delta f_{B2}$ between blocks in the second embodiment is $$\Delta f_{B2} \geq 2f_{IF} + 2X_b \qquad (4)$$

Hence, the average channel spacing is given by $$\Delta f_{B2}/2 \geq f_{IF} + X_b \qquad (5)$$

The average channel spacing given by equation (5) is less than the average channel spacing in the first embodiment, as given by equation (3), and is less than the channel spacing utilized in prior art systems. From equations (2) and (4) it can be seen that the second embodiment is useful only where $X_b$ is less than $1.5\ X_a$. In each embodiment, the desired power penalty is used to determine the channel spacing $X_a$ or $X_b$ as described above.

In summary, the present invention provides a method for assigning optical channels in a specified frequency range to increase the information-carrying capacity of the system by increasing the number of optical channels that can be utilized. The channel spacing technique of the invention can be used with conventional optical communication equipment by assigning laser frequencies in the transmitter to obtain the blocks and block spacing as described above. At the receiver, the frequency of the local oscillator is set to receive the selected channel as described above.

Figure 5:
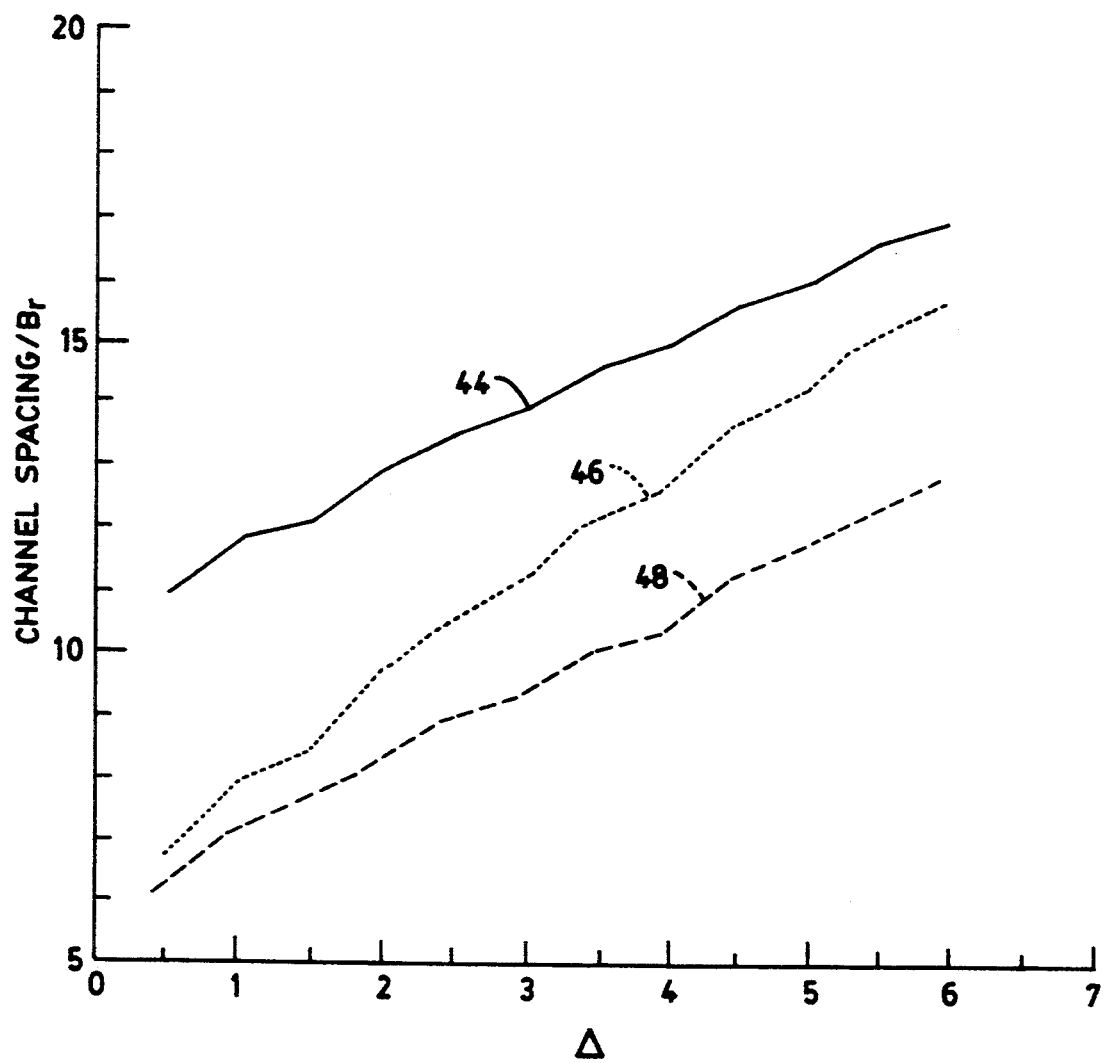
FIG. 5 is a graph of channel spacing/bit rate as a function of frequency modulation index $\Delta f$ for a maximum 1 dB reduction in receiver sensitivity due to co-channel interference.

FIG. 5 shows the optical channel spacing/bit rate $B_r$ in the first embodiment and the second embodiment plotted as a function of the FSK modulation index ($\Delta$) for an assumed power penalty $P_{pen}$ of 1 dB due to channel co-interference and assuming negligible laser line width. From FIG. 5 it can be seen that the present invention is advantageous when the signal spectra are compact. The present invention works best when the intermediate frequency $F_{IF}$ is much greater than the bit rate $B_r$. Conventional dual filter FSK (curve 44) requires an optical channel spacing of approximately 11.2 $B_r$ ($\Delta=0.5$, $f_{IF}=5\ B_r$) as compared with 6.8 $B_r$ (39% reduction) for the first embodiment (curve 46) and 6.6 $B_r$ (41% reduction) when the channel spacing is further compressed (curve 48) according to the second embodiment. By way of example, for an intermediate frequency $f_{IF}$ of 3 GHz, a bit rate $B_r$ of 600 Mb/s and a modulation index $\Delta$ of 0.5, the conventional channel spacing is approximately 6.7 GHz, the channel spacing according to the first embodiment is 4.1 GHz and the channel spacing according to the second embodiment is 3.96 GHz. This translates to a possible 70% increase in the number of channels within the same optical bandwidth.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A method for reducing channel spacing among a plurality of optical channels in the transmission of an optical signal in an optical heterodyne communication system, comprising the steps of:

selecting the optical channels;

grouping the optical channels into blocks, each block including at least two optical channels having a predetermined channel spacing in the frequency spectrum;

selecting a block spacing $\Delta f_B$ between blocks in the frequency spectrum such that when the optical signal, including a selected optical channel centered at frequency $f_s$, is heterodyned with a local oscillator lightwave at a frequency $f_{LO}$ to produce an intermediate frequency signal centered at frequency $f_{IF}$, interference in the selected channel resulting from adjacent blocks is less than a predetermined value.

2. A method as defined in claim 1 wherein each optical channel has a bandwidth X, and the step of grouping the optical channels is performed such that the predetermined channel spacing is approximately equal to the bandwidth X of each optical channel.

3. A method as defined in claim 1 wherein the step of selecting a block spacing $\Delta f_{B1}$ is performed such that the inequality $$\Delta f_{B1} \geq 2f_{IF} + 3X_a,$$

where $X_a$ = the channel spacing within each block, is satisfied.

4. A method as defined in claim 3 wherein each optical channel has a bandwidth X, and the channel spacing $X_a$ is equal to or slightly greater than the bandwidth X of each optical channel.

5. A method as defined in claim 3 wherein the channel spacing $X_a$ is selected to produce interference from nonselected channels corresponding to a power penalty of about 1 dB.

6. A method as defined in claim 1 wherein the step of selecting a block spacing $\Delta f_{B2}$ is performed such that the inequality, $$\Delta f_{B2} \geq 2f_{IF} + 2X_b,$$

where $X_b$ = the channel spacing within each block, is satisfied, and a channel in an adjacent block overlaps a nonselected channel in the selected block.

7. A method as defined in claim 4 wherein the channel spacing $X_b$ is selected to produce interference from nonselected channels corresponding to a power penalty of about 1 dB.

8. A method as defined in claim 1 wherein each block contains only two optical channels.

9. A method for operating an optical heterodyne communication system wherein an optical signal including a plurality of optical channels is transmitted on a single optical waveguide, comprising the steps of:
selecting the optical channels;
grouping the optical channels into blocks, each block including at least two optical channels having a predetermined channel spacing in the frequency spectrum;
selecting a block spacing $\Delta f_B$ between blocks in the frequency spectrum such that when an optical signal, including a selected optical channel centered at frequency $f_S$, is heterodyned with a local oscillator lightwave at a frequency $f_{LO}$ to produce an intermediate frequency signal centered at frequency $f_{IF}$, interference in the selected channel resulting from adjacent blocks is less than a predetermined value;
combining the said optical channels into said optical signal;
sending the optical signal from an optical transmitter to an optical heterodyne receiver; and
extracting an information signal from the selected optical channel.

10. A method as defined in claim 9 wherein the step of extracting an information signal includes heterodyning the optical signal with a local oscillator lightwave at a frequency that is higher than the center frequency of the selected optical channel when the selected optical channel is the higher frequency channel in a block.

11. A method as defined in claim 9 wherein the step of extracting an information signal includes heterodyning the optical signal with a local oscillator lightwave at a frequency that is lower than the center frequency of the selected optical channel when the selected optical channel is the lower frequency channel in a block.

12. A method as defined in claim 9 wherein the step of selecting a block spacing $\Delta f_{B1}$ is performed such that the inequality $$\Delta f_{B1} \geq 2f_{IF} + 3X_a,$$

where $X_a$ = the channel spacing within each block, is satisfied.

13. A method as defined in claim 9 wherein the step of selecting a block spacing $\Delta f_{B2}$ is performed such that the inequality, $$\Delta f_{B2} \geq 2f_{IF} + 2X_b,$$

where $X_b$ = the channel spacing within each block, is satisfied, and a channel in an adjacent block overlaps a nonselected channel in the selected block.

14. An optical heterodyne communication system comprising:
an optical transmitter for transmitting an optical signal including a plurality of optical channels, said optical channels being grouped into blocks wherein each block includes at least two optical channels having a predetermined channel spacing in the frequency spectrum and adjacent blocks are spaced in the frequency spectrum by a block spacing $\Delta f_B$ such that when an optical signal, including a selected optical channel centered at a frequency $f_S$, is heterodyned with a local oscillator lightwave at a frequency $f_{LO}$ to produce an intermediate frequency signal centered at frequency $f_{IF}$, interference in the selected channel from adjacent blocks is less than a predetermined value;
an optical receiver for receiving said optical signal including means for heterodyning said optical signal with a local oscillator lightwave to produce an intermediate frequency signal and means responsive to the intermediate frequency signal for extracting an information signal from the selected optical channel; and
optical waveguide means for carrying said optical signal from said optical transmitter to said optical receiver.

15. An optical heterodyne communication system as defined in claim 14 wherein the predetermined channel spacing within each block is approximately equal to a bandwidth of each optical channel.

16. An optical heterodyne communication system as defined in claim 15 wherein said blocks are spaced in frequency by a block spacing $\Delta f_{B1}$ given by the inequality $$\Delta f_{B1} \geq 2f_{IF} + 3X_a,$$

where $X_a$ = the channel spacing within each block.

17. An optical heterodyne communication system as defined in claim 14 wherein said blocks are spaced in frequency by a block spacing $\Delta f_{B2}$ given by the inequality $$\Delta f_{B2} \geq 2f_{IF} + 2X_b,$$

where $X_b$ = the channel spacing within each block, and a channel in an adjacent block overlaps a nonselected channel in the selected block.

18. An optical heterodyne communication system as defined in claim 17 wherein the channel spacing $X_b$ is selected to produce interference from nonselected channels corresponding to a power penalty of about 1 dB.

19. An optical heterodyne communication system as defined in claim 14 wherein said optical receiver includes means for heterodyning the received optical signal with said local oscillator lightwave at a frequency that is higher than the center frequency of the selected optical channel when the selected optical channel is the higher frequency channel in a block.

20. An optical heterodyne communication system as defined in claim 14 wherein said optical receiver including means for heterodyning the received optical signal with said local oscillator lightwave at a frequency that is lower than the center frequency of the selected optical channel when the selected optical channel is the lower frequency channel in a block.

21. A method of transmitting an optical signal to reduce average channel spacing in a coherent optical communication system having a transmitter and a receiver including a local oscillator, comprising the steps of:
a) grouping optical channels of the transmitter into blocks wherein spacing between optical channels in a block is selected so that optical interference between channels in a block does not exceed a predetermined level at the receiver when the optical signal is heterodyned with a lightwave from the local oscillator;
b) selecting spacing between blocks so that optical interference of optical channels of adjacent blocks with a selected optical channel to be received at the receiver does not exceed the predetermined level when the optical signal is heterodyned with the lightwave from the local oscillator; and
c) combining the optical channels and blocks into the said optical signal and transmitting the optical signal with said optical channel spacing and said block spacing.

22. A method as recited in claim 21 wherein pairs of optical channels are grouped into blocks.

23. A method as recited in claim 21 wherein the transmitter comprises multiple optical sources.

24. In an optical heterodyne system, having a transmitter and a receiver including a local oscillator, a method for transmitting an optical signal including a plurality of optical channels, comprising the steps of:
a) grouping pairs of optical channels together to form blocks, wherein the optical channels are spaced within said blocks such that optical interference does not exceed an predetermined at the receiver after heterodyning the optical signal with a lightwave from the local oscillator, and wherein a spacing between blocks is such that interference from adjacent optical channels with the selected optical channel when heterodyned with the local oscillator lightwave does not exceed a predetermined level;
b) transmitting the optical signal to a receiver;
c) where a lower frequency optical channel in a block is a selected channel to be received by the receiver, negatively displacing the selected channel to a lower frequency relative to the lower frequency channel by the frequency of the local oscillator; and
d) where a higher frequency optical channel in the block is a selected channel to be received by the receiver, positively displacing the selected channel to a higher frequency relative to the higher frequency channel by the frequency of the local oscillator.

25. A method as recited in claim 24 wherein the spacing between blocks is a minimum spacing allowable without exceeding a predetermined level of optical interference.

26. A method as recited in claim 24 wherein the transmitter comprises multiple optical sources.

27. A method of allocating optical channels in a coherent optical communication system having a receiver with a local oscillator for generating a lightwave at a frequency of $f_{LO}$ and a transmitter for transmitting an optical signal including a plurality of optical channels, comprising the steps of:
a) grouping pairs of optical channels in blocks such that channels in a block are separated by a minimum acceptable channel spacing $X_a$ for limiting optical interference between optical channels in a block to a predetermined level after the signal is heterodyned with the local oscillator lightwave to provide an intermediate frequency signal centered at a frequency $f_{IF}$; and
b) spacing blocks of optical channels by a frequency of $\Delta f_B$ which is equal to or greater than $2f_{IF}+3X_a$.

28. A method as recited in claim 27 wherein said method is performed by allocation of laser frequencies in the transmitter.

29. A coherent optical communication system for transmitting an optical signal including a plurality of optical channels comprising:
a) a transmitter for transmitting said optical signal wherein said optical channels are grouped in blocks, each block containing optical channels separated by a minimum acceptable frequency spacing for not exceeding an acceptable level of interference between the channels after the optical signal is heterodyned with a local lightwave and each block being separated from adjacent blocks by a frequency such that optical channels in adjacent blocks do not significantly interfere with a selected optical channel after heterodyning; and
b) a receiver including a local oscillator for generating a local lightwave for heterodyning with the optical signal received from the transmitter.

30. A coherent optical communication system as recited in claim 29 wherein the transmitter comprises multiple optical sources.

31. A coherent optical communication system as recited in claim 30 wherein the multiple optical sources comprise lasers.

32. A coherent optical communication system as recited in claim 30 further comprising an optical combiner for combining outputs from the multiple light sources.

* * * * *